(No Model.)
F. F. FERGUSON.
COMBINED RIDGER, PULVERIZER, SEED PLANTER, AND FERTILIZER DISTRIBUTER.
No. 471,852. Patented Mar. 29, 1892.
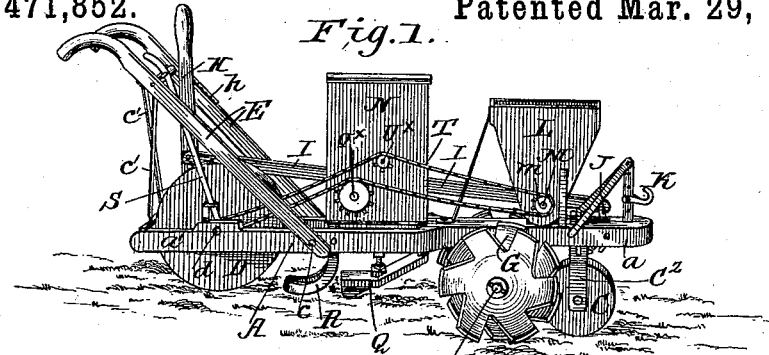
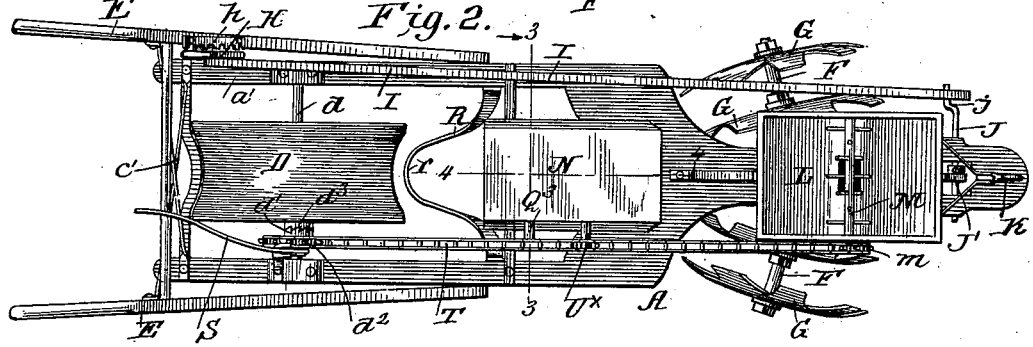
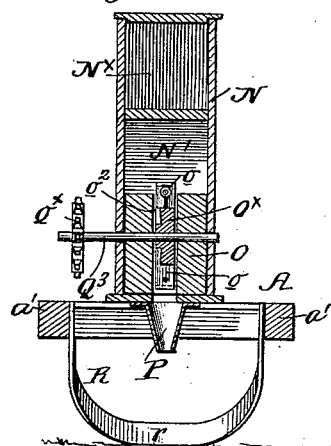
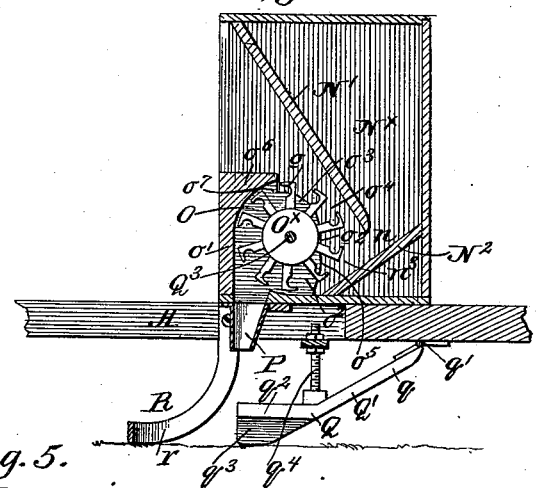
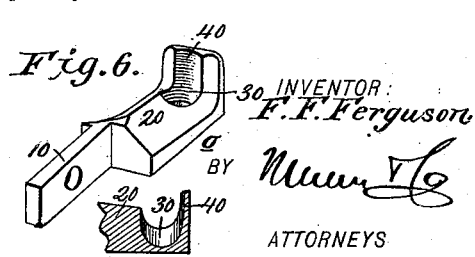
WITNESSES:
Fred G. Dieterich
M. D. Blondel
INVENTOR:
F. F. Ferguson
BY
ATTORNEYS

UNITED STATES PATENT OFFICE.

FINTON F. FERGUSON, OF MURFREESBOROUGH, NORTH CAROLINA.

COMBINED RIDGER, PULVERIZER, SEED-PLANTER, AND FERTILIZER-DISTRIBUTER.

SPECIFICATION forming part of Letters Patent No. 471,852, dated March 29, 1892.

Application filed June 29, 1891. Serial No. 397,920. (No model.)

*To all whom it may concern:*

Be it known that I, FINTON F. FERGUSON, residing at Murfreesborough, in the county of Hertford and State of North Carolina, have invented certain new and useful Improvements in a Combined Ridger, Pulverizer, Seed-Planter, and Fertilizer-Distributer, of which the following is a specification.

My invention relates to a combined seed-planter, ridger, pulverizer, and fertilizer-distributer, more especially adapted for peanut-planting; and it has for its object to provide a machine of this character which will be simple in construction, cheap as to cost, and which will drop the peas without the danger of crushing them.

To this end my invention consists in the peculiar combination and novel arrangement of parts, all of which will hereinafter be fully described in the annexed specification, and particularly pointed out in the claims, reference being had to the accompanying drawings, in which—

Figure 1 is a perspective view of my improvement. Fig. 2 is a top plan view of the same. Fig. 3 is a transverse section of the seed-box and the pea-delivery mechanism. Fig. 4 is a longitudinal section of the same on the line 4 4, Fig. 2; and Fig. 5 is a detail view hereinafter referred to. Fig. 6 is a detail view of one of the buckets.

In the accompanying drawings, A represents the main frame, which consists of a central forward portion $a$ and a rear bifurcated portion $a'$, said frame being supported at its forward end on a vertically-adjustable caster or guide-roller C and at its rear end on the axle $d$ of the roller D, as shown.

E E indicate the handles, which are connected to the frame at $c$ and braced by the cross-bars $c'$ $c'$.

F indicates a bent shaft journaled under the front end $a$ of the frame, on which is journaled a series of ridgers or disks G, which, as will be noticed by reference to Fig. 2, are arranged in pairs, which converge toward each other at their rear ends, whereby to throw the dirt upward to form a central ridge and to provide means whereby the operator can readily adjust the caster-wheel C so as to regulate the depth of the disks or to lift them out of contact with the ground, I provide a lever H, pivoted at its lower end to the main frame, its upper end being arranged to engage a rack or detent $h$ on the adjacent handle, as clearly shown in the drawings.

I indicates a bar, which is pivoted at its rear end to the lever H, its front end being connected to a crank-arm $j$ on a short arm J, (see Fig. 5,) carrying a segmental gear $J'$, which meshes with a rack $C'$ on the standard $C^2$ of the caster C. By this construction it will be seen that the operator, by simply moving the lever H forward or backward, can readily adjust the depth of the ridgers G.

K indicates an adjustable clevis, and L the fertilizer-box, which is arranged on the end $a$ of the frame at a point between the ridgers G and the caster-wheel C, said box being of the usual hopper shape and provided with an ordinary stirring-shaft M, which is provided with a sprocket $m$ and is operated in the manner presently described.

N indicates the seed-box, the rear wall of which is formed of a downwardly and inwardly inclined board $N'$, which extends to near the bottom of the seed-chamber $N^x$, which bottom is formed of a board $N^2$, inclined downwardly from the front to the rear, a discharge opening or throat $n$ being formed between it and the board $N'$, as shown. By this arrangement it will be seen that the peas are discharged through a narrowed throat into a pocket $n^3$ in front of a frame or box O, the rear wall of which is closed, as at $o'$, while the front or inner wall is slotted, as at $o^2$, and is formed with a curved upper portion $o^3$, between which and the lower end of the board $N'$ a throat $o^4$ is formed and a rearwardly-inclined face $o^5$, said box being also provided with an upper extension $o^6$, slotted at $o^7$.

By reference to Fig. 3 it will be seen that by curving the front edge of the box O, as stated, and journaling the disk $O^x$, as shown, the radial buckets or lifters $o$ will project through the slotted inner wall in such a manner that the lowermost and the uppermost projecting buckets will not extend out as far as the horizontally-disposed buckets. This arrangement I have found necessary to obtain a regular lifting of the peas without the danger of breaking them, and to render such operation still more positive and to provide for the lifting of one or two peas by each bucket I make each of such buckets of the shape shown in Fig. 6—i. e., I provide each with an apertured stem 10, (by which it is secured to the disk,) a tapered cutting-face 20, which ends at a cup-like depression 30, the front wall of which is formed by the upwardly-projecting finger 40, having an inner concaved face, as shown. By constructing the buckets in the manner stated the cup-like portions will always gather the peas, the concaved finger preventing said peas from being thrown out during their movement up through throat $o^4$, the tapered faces 20 serving to part any excess of peas which might accumulate in the pocket $n^3$. Now as the disk $O^\times$ is turned in a manner presently described the peas will be carried up through the opening $o^7$ and dumped into the rear part of the box O and discharged into a chute P, which is formed of a curved plate open at its rear, as shown. By forming the box N with an open rear portion and making the chute P open, as stated, the plowman can at all times observe the operation of the distributer, and thereby readily tell when it is empty or the distributer fails to operate.

The furrow-opener Q, before referred to, and which is clearly illustrated in Figs. 1 and 4, consists of a frame Q', formed with a forwardly and upwardly inclined member $q$, hinged at $q'$ to the frame A, and with a horizontal portion $q^2$, having an opener-blade $q^3$ in its under face, the front edge of which inclines upward, as shown, and to regulate the cutting depth of the blade $q^3$ I make the frame Q' adjustable by means of the screw rod and nut $q^4$.

By reference to Fig. 1 it will be seen that the furrow-opener Q is arranged to open the furrow centrally of the ridge made by the ridging-disks G, and that the seed-chute serves to deposit the peas in the furrow just to the rear of the blade $q^3$ and in front of a covering-blade R, formed of a metal bar bent to a U shape and curved rearward, as at $r$, to form the scraper or covering blade proper. This bar is secured to the frame and in practice is also made adjustable.

Upon one end of the drive-shaft $d$ is a sliding clutch $d'$, carrying a sprocket-wheel $d^2$, which is adapted to engage a clutch member $d^3$ on the roller D, a shifting-lever S being provided for throwing said clutch-sections into or out of operative positions.

T indicates an endless chain, which is passed over the sprocket-wheels $d^2$ and the wheel $m$ and arranged to engage the sprocket $o^\times$ on the distributing-wheel shaft $Q^3$ and over an idler or spud $U^\times$, as shown.

From the foregoing description, taken in connection with the drawings, the complete operation and advantages of my improved machine will be readily understood.

While I have shown it especially adapted for peanut-planting, it is manifest that by placing the ordinary cotton-seed box in place of the pea-box the machine will be in condition for planting cotton; or, if desired, it can be adapted for planting corn or potatoes.

Having thus described my invention, what I claim, and desire to secure by Letters Patent, is—

1. The combination, with the main frame, the seed and fertilizer distributing devices carried thereby, and the supporting wheel or roller D, of the caster or guide wheel C, formed with a standard having a rack-face C', the crank-shaft J, having a segmental gear J', adapted to engage said rack-face, and the levers H and I for operating said crank-shaft J, arranged as shown, and for the purposes described.

2. The combination, with the frame A, the ridgers G, roller D, and the seed-distributing devices, of the furrow-opener Q, consisting of a frame Q', having a straight rear portion and an upwardly-inclined portion hinged at its front end to frame A, its rear end connected with the main frame and arranged for vertical adjustment, and the blade $q^3$ on the under face of the straight portion $q$, formed with a front upwardly-inclined face, substantially as shown and described.

3. The combination, with the seed-box N, formed with a rear inclined board N', a discharge-throat $n$, and an open rear portion, of the box O, formed in the lower part of said rear portion, said box formed with a closed rear wall, an extension $o^4$, the front wall of the extension and box proper being slotted, as at $o^2$ $o^7$, said front wall being curved, as at $o^3$, and inclined, as at $o^5$, the disk $O^\times$, journaled in said box formed with radial buckets $o$, said buckets arranged to project beyond the said front wall, as shown, and for the purpose described.

4. In a seeding and fertilizing machine essentially as described, the buckets $o$, formed each of an apertured stem 10, a tapered upper edge 20, cup-like depressions 30, and the concaved fingers 40, all arranged as and for the purposes described.

5. The combination of the main frame having a straight forward member $a$, the fertilizer-hopper secured thereon, a caster or guide wheel held for vertical adjustment therein, and ridging-disks journaled thereon, a rear bifurcated portion A', the wheel D, journaled in the end thereof and forming the rear support therefor, the seed-box N, mounted thereon, the furrow-opener Q, the coverer-blade R, the endless-chain connection between the shaft of wheel D and the seed and fertilizer distributing wheels, the clutch mechanism for said chain connection, and the crank-shaft and gear connections for adjusting the front guide-wheel and lever mechanism, operated from the rear of the machine, for operating said crank-shaft, all arranged substantially as and for the purpose described.

FINTON F. FERGUSON.

Witnesses:
E. C. WORRELL,
G. W. GRIMES.